US008884873B2

(12) United States Patent
Tao

(10) Patent No.: US 8,884,873 B2
(45) Date of Patent: Nov. 11, 2014

(54) HANDHELD ELECTRONIC APPARATUS AND INFORMATION RENDERING METHOD

(75) Inventor: Fei-Fei Tao, New Taipei (TW)

(73) Assignee: Wistron Corporation, New Taipei (TW)

( * ) Notice: Subject to any disclaimer, the term of this patent is extended or adjusted under 35 U.S.C. 154(b) by 176 days.

(21) Appl. No.: 13/612,669

(22) Filed: Sep. 12, 2012

(65) Prior Publication Data

US 2013/0257711 A1    Oct. 3, 2013

(30) Foreign Application Priority Data

Mar. 30, 2012 (CN) .......................... 2012 1 0090825

(51) Int. Cl.
*G09G 5/00* (2006.01)

(52) U.S. Cl.
USPC ........................................................ 345/156

(58) Field of Classification Search
CPC ..................... H04M 1/72522; H04M 1/72566; G09G 2320/062; G09G 2330/021; G09G 3/3406
USPC ........................................................ 345/156
See application file for complete search history.

(56) References Cited

U.S. PATENT DOCUMENTS

2006/0187217 A1* 8/2006 Son et al. ...................... 345/204
2006/0290661 A1* 12/2006 Innanen et al. ............... 345/156
2008/0167078 A1* 7/2008 Eibye ............................. 455/566

OTHER PUBLICATIONS

TW Office Action dated Aug. 4, 2014.
Partial translation of TW Office Action dated Aug. 4, 2014.

* cited by examiner

*Primary Examiner* — Viet Pham
(74) *Attorney, Agent, or Firm* — McClure, Qualey & Rodack, LLP

(57) ABSTRACT

A handheld apparatus device includes an input interface device, a display device, a memory and a processor. The processor, coupled to the input interface device, the display device and the memory, drives the input interface device to provide a configuration command in response to a user configuration event, and determines and stores a data structure into the memory in response to the configuration command. The data structure records to-do list information and display mode information corresponding to the to-do list information. The processor further determines whether an idle event occurs. When the idle event occurs, the processor drives the electronic handheld apparatus to enter a standby mode, in which the processor further selectively drives the display device to perform a standby mode display operation with reference to the display mode information, and the display device accordingly displays the to-do list information with dimmed backlight.

6 Claims, 4 Drawing Sheets

HANDHELD ELECTRONIC APPARATUS AND INFORMATION RENDERING METHOD

This application claims the benefit of People's Republic of China application Serial No. 201210090825.8, filed Mar. 30, 2012, the subject matter of which is incorporated herein by reference.

BACKGROUND OF THE INVENTION

1. Field of the Invention

The invention relates in general to a handheld electronic apparatus and associated information rendering method, and more particularly to a handheld electronic apparatus and associated information rendering method capable of providing a to-do list reminder function when the handheld electronic device is under a standby mode.

2. Description of the Related Art

As the technology continuously progresses, processing capabilities of circuits in handheld electronic apparatuses are also increasingly enhanced. Meanwhile, handheld electronic apparatuses are integrated with various functions including digital assistant, wireless network access, satellite positioning and satellite navigation to provide users with ease of use. Taking a mobile phone as the handheld electronic apparatus for example, through the carried mobile phone, a user is allowed to establish a communication link with a communication system (e.g., Global System for Mobile Communications (GSM)), and to perform audio communications with other users of the communication system.

Along with developments in electronic industries, the public also gradually demands higher standards regarding added functions and convenience of handheld electronic apparatuses. Therefore, a solution providing enhanced added functions and convenience of handheld electronic apparatuses is always a focus that industry developers strive to achieve.

SUMMARY OF THE INVENTION

According to an aspect of the present invention, an information rendering method for a handheld electronic apparatus is provided. The handheld electronic apparatus includes an input interface device, a display device, a memory and a processor. The information rendering method includes the following steps. The processor first executes a to-do list configuration process. In the to-do list configuration process, the input interface device provides a configuration command in response to a user configuration event, and the processor determines and stores a data structure into the memory in response to the configuration command. The data structure records to-do list information and display mode information corresponding to the to-do list information. The processor then executes a mode switching process. In the mode switching process, the processor determines whether an idle event occurs. When the idle event occurs, the processor drives the handheld electronic apparatus to enter a standby mode. Under the standby mode, the processor further selectively drives the display device to perform a standby mode display operation with reference to the display mode information, and the display device accordingly displays the to-do list information with dimmed backlight in the standby mode display operation.

According to another aspect of the present invention, a handheld electronic apparatus is provided. The handheld electronic apparatus includes an input interface device, a display device, a memory and a processor. The processor, coupled to the input interface device, the display device and the memory, drives the input interface device to provide a configuration command in response to a user configuration event, and the determines and stores a data structure into the memory in response to the configuration command. The data structure records to-do list information and display mode information corresponding to the to-do list information. The processor further determines whether an idle event occurs. When the idle event occurs, the processor drives the handheld electronic apparatus to enter a standby mode. Under the standby mode, the processor further selectively drives the display device to perform a standby mode display operation with reference to the display mode information, and the display device accordingly displays the to-do list information with dimmed backlight in the standby mode display operation.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
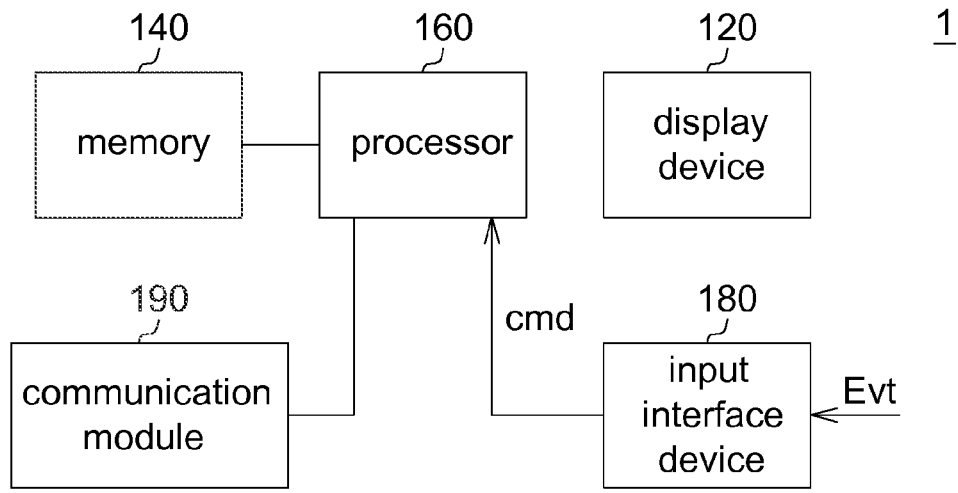
FIG. 1 is a block diagram of a handheld electronic apparatus according to an embodiment of the present invention.

FIG. 1 shows a block diagram of a handheld electronic apparatus according to an embodiment of the present invention. A handheld electronic apparatus 1 includes a display device 120, a memory 140, a processor 160, an input interface device 180, and a communication module 190. The display device 120, the memory 140, the input interface device 180 and the communication module 190 are coupled to the processor 160. For example, the handheld electronic apparatus 1 is a mobile phone, and the communication module 190 may be a Global System for Mobile Communications (GSM) communication module. Thus, the handheld electronic apparatus 1 is enabled to communicate with a GSM communication system via the communication module 190.

The memory 140 stores software and firmware needed by operations of the processor 160 as well as software and firmware needed for controlling sub-units in the handheld electronic apparatus 1. Accordingly, the processor 160 is allowed to control the sub-units in the handheld electronic apparatus 1. In an embodiment, the processor 160 performs an information rendering method to provide a user with a display service of to-do list information. For example, the information rendering method according to the embodiment includes a to-do list configuration process and a mode switching process. Examples shall be given below for further explaining details of the information rendering method of the embodiment.

Figure 2:
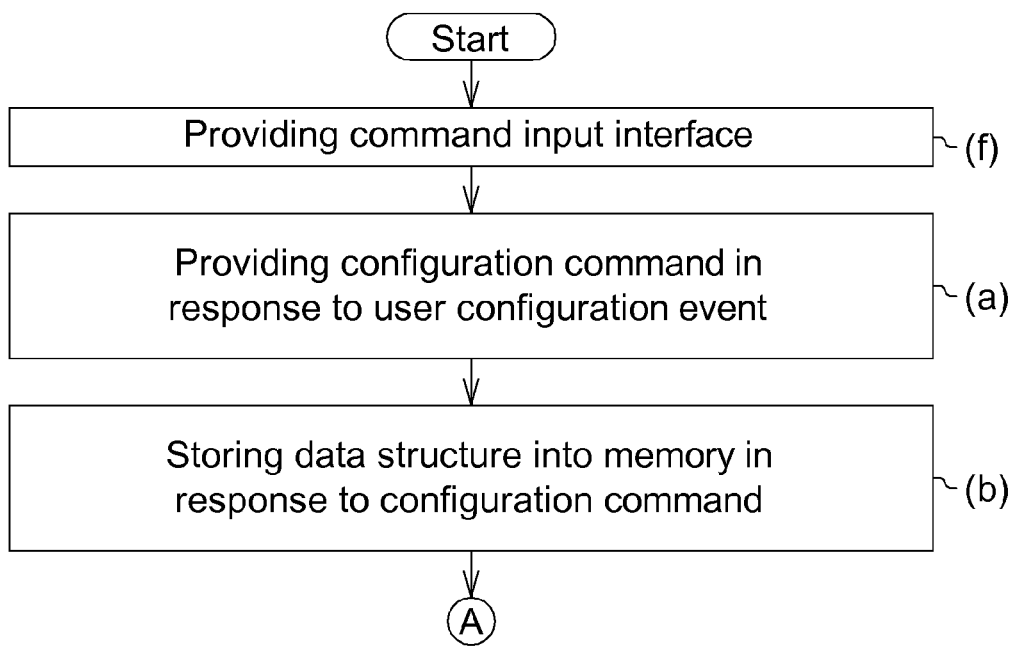
FIG. 2 is a flowchart of a to-do list configuration process in an information rendering method according to an embodiment.

FIG. 2 shows a flowchart of a to-do list configuration process in the information rendering method according to an embodiment of the present invention. Further, the to-do list configuration process in the information rendering method of the embodiment includes the following step. In Step (a), the input interface device 180 provides a configuration command cmd in response to a user configuration event Evt. In Step (b), the processor determines and stores a data structure DS into the memory 140 in response to the configuration command cmd. The data structure DS records a set of to-do list information and a set of display mode information corresponding to the to-do list information.

Figure 3A:
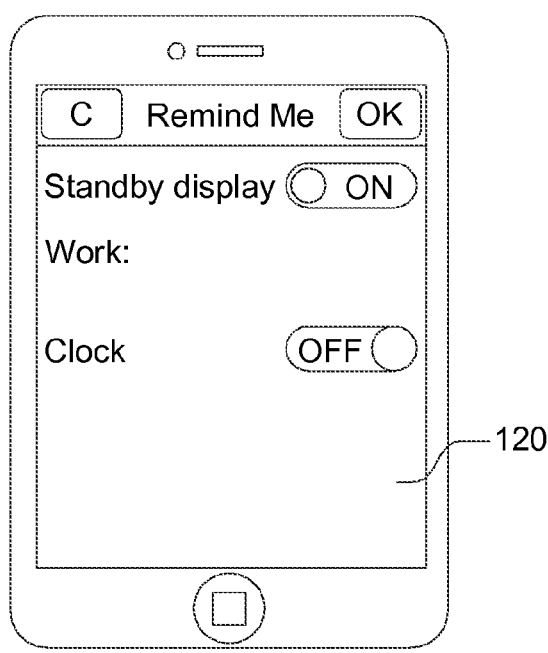
FIG. 3A and FIG. 3B are schematic diagrams of a user command input interface provided by a display device 120.

For example, before Steps (a) and (b), the to-do list configuration process further includes Step (f). In Step (f), from the memory 140, the processor 160 accesses an application for driving the display device 120 to provide a user command input interface to a user of the handheld electronic apparatus 1. For example, the user command input interface may be as shown in FIG. 3A, in which the display device 120 correspondingly displays image-type columns "standby display", "alarm" and "content". Switch interface images are correspondingly displayed at the right side of the image-type columns "standby display" and "alarm", respectively, and a blank data column is correspondingly displayed at the right side of the image-type column "content".

Figure 3B:

Thus, the user is allowed to provide the configuration command cmd by triggering the user configuration event Evt using the user command input interface provided in Step (f) to further input the data structure DS. Taking FIG. 3B for example, a to-do list information column and a display mode information column in the data structure DS respectively record information of "the dry clean pick up" and "standby display ON". For example, the data structure DS further includes columns of a ringing mode, a ringing date and time respectively recording information of "ON", "2012/2/29" and "17:30".

Through the to-do list configuration process in FIG. 2, the user may enter multiple data structures, which are stored into the memory 140, for example. For example, after the to-do list configuration process of the embodiment, the user may also trigger corresponding editing events. In response to the editing events, the input interface device 180 provides corresponding editing configuration commands. In response to the editing configuration commands, the processor 160 edits the data structures. Assume that an edit event in an actual operation is a to-do list sequence event. In response to a corresponding edit command, the processor 160 sorts multiple data structures in the memory 140 to accordingly determine corresponding priority sequences or triggering time sequences of the data structures.

In other similar operation examples, the edit event may be a user operation event for adding, editing or modifying information of the data structures DS. In response to a corresponding command, the processor 160 correspondingly modifies or adjusts the data structures in the memory 140.

Operation details of the input interface device 180 providing the corresponding command in response to the edit event are substantially the same as those for providing the configuration command cmd in response to the user configuration event Evt. Further, operation details of the processor 160 editing the data structures DS in response to the command are substantially the same as those for inputting the data structures DS in response to the configuration command cmd. Details of the similar operations shall be omitted herein.

Figure 4:
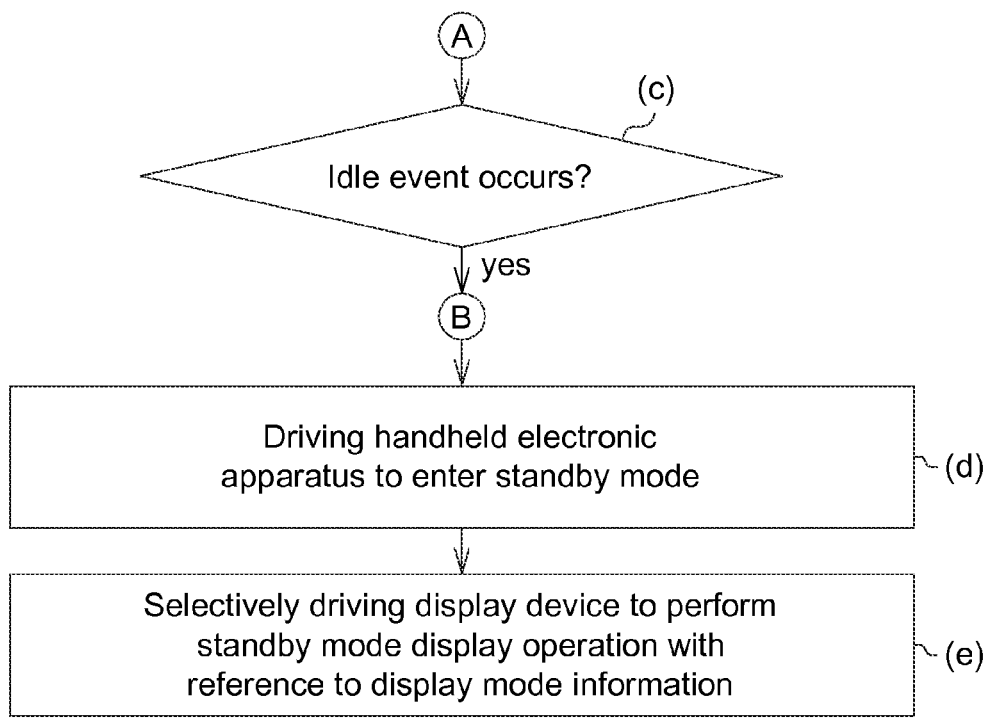
FIG. 4 is a flowchart of a mode switching process in an information rendering method according to an embodiment of the present invention.

FIG. 4 shows a flowchart of a mode switching process of an information rendering method according to an embodiment of the present invention. The mode switching process of the information rendering method of the embodiment includes the following steps. In Step (c), the processor 160 determines whether an idle event occurs. When the idle event occurs, the mode switching process of the embodiment performs Step (d), in which the processor 160 drives the handheld electronic apparatus 1 to enter a standby mode. For example, under the standby mode, the processor 160 dims brightness of backlight of the display device 120 to reduce power consumed by the handheld electronic apparatus 1 under the standby mode.

Figure 5:
FIG. 5 is a schematic diagram of a standby mode display operation performed by a display device 120.

In Step (e), under the standby mode, the processor 160 further selectively drives the display device 120 to perform a standby mode display operation with reference to the information mode information recorded in the data structure DS. For example, the display mode information indicates "standby display ON", and so the processor 160 accordingly drives the display device 120 to display the to-do list information in the data structure DS with the dimmed backlight. For example, the standby mode display operation performed by the display device 120 may be as shown in FIG. 5. Under the circumstances that the backlight is dimmed, the display device 120 displays the to-do list information in a still manner.

Figure 6:
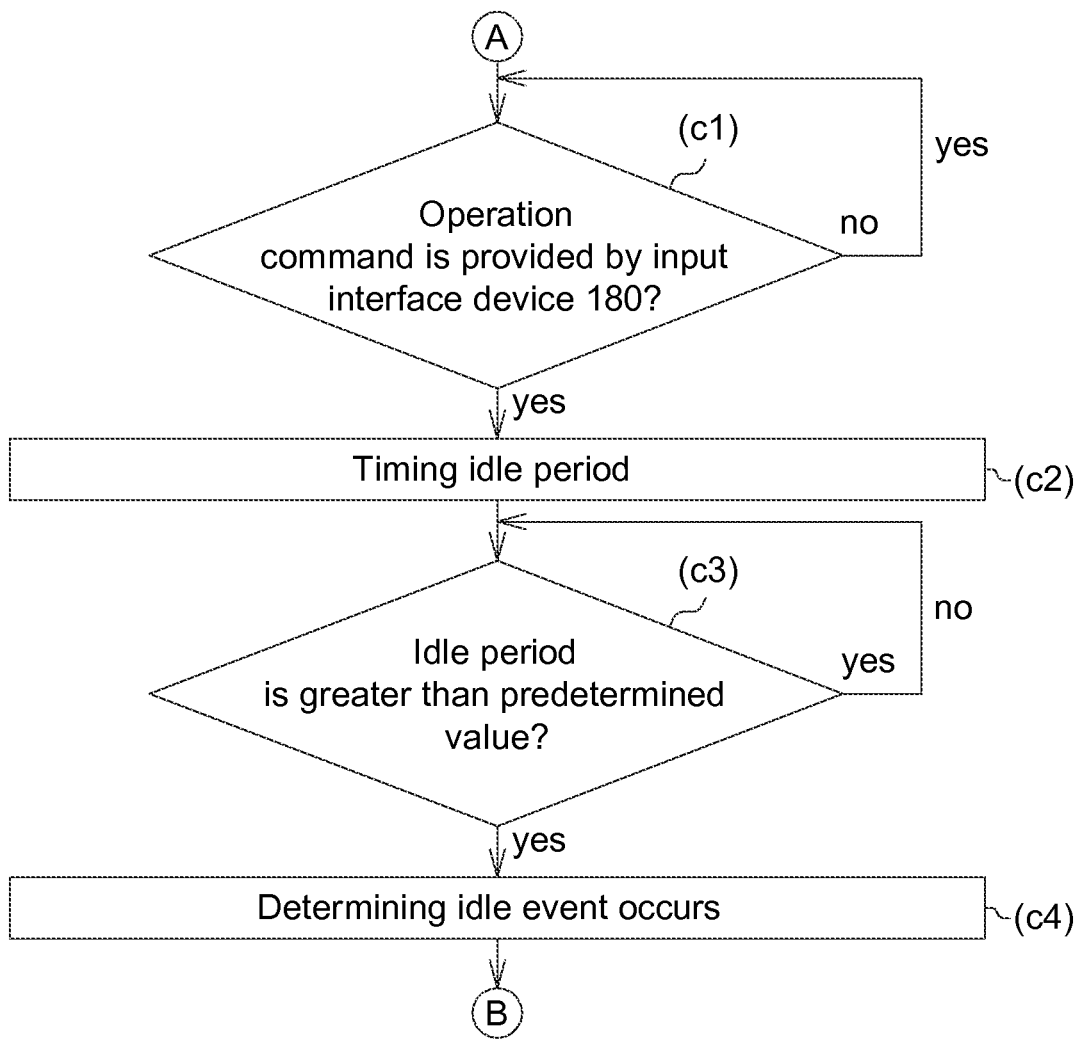
FIG. 6 is a detailed flowchart of a mode switching process in an information rendering method according to an embodiment of the present invention.

FIG. 6 shows a detailed flowchart of a mode switching process in an information rendering method according an embodiment of the present invention. In an operation example, in Step (c) of the mode switching process of the embodiment, the processor 160 correspondingly determines whether the idle event occurs by performing Sub-steps (c1) to (c4). In Sub-step (c1), the processor 160 determines whether the input interface device 180 provides an operation command to the processor 160 in response to a user operation event. When the input interface device 180 does not provide the operation command to the processor 160, it means that the handheld electronic device 1 is substantially in an idle state, and Sub-step (c2) is performed. In Sub-step (c2), the processor 160 drives a timer in the handheld electronic apparatus 1 to perform a timing operation for timing an idle period. For example, the timer may be implemented by software or hardware.

In Sub-step (c3), the processor 160 determines whether a length of the idle period is substantially greater than a predetermined value. If the length of the idle period is substantially greater than the predetermined value, Sub-step (c4) is performed, in which the processor 160 determines that the idle event occurs.

In conclusion, a handheld electronic apparatus of an embodiment is provided with a processor for executing a to-do list configuration process and a mode switching process. In the to-do list configuration process, the handheld electronic apparatus employs an input interface device to provide a configuration command in response to a user configuration event, and employs the processor to determine a data structure in response to the configuration command. The data structure records to-do list information and display mode information corresponding to the to-do list information. In the mode switching process, when an idle event of the handheld electronic apparatus occurs, the processor drives the handheld electronic apparatus to enter a standby mode, and selectively drives the display device to perform a standby mode display operation with reference to the display mode information. Accordingly, compared to a conventional handheld electronic apparatus, the handheld electronic apparatus of the embodiment is capable of displaying pre-entered to-do list information under the standby mode.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An information rendering method, applied to a handheld electronic apparatus, the handheld electronic apparatus comprising an input interface device, a display device, a memory and a processor, the method comprising:

executing a to-do list configuration process by the processor, the to-do list configuration process comprising:

providing a configuration command by the input interface device in response to a user configuration event; and determining and storing a data structure into the memory by the processor in response to the configuration event; wherein, the data structure records to-do list information and display mode information corresponding to the to-do list information; and executing a mode switching process by the processor, the mode switching process comprising:

determining whether an idle event occurs by the processor, wherein the step of determining whether the idle event occurs comprises:

determining whether the input interface device provides an operation command to the processor by the processor in response to a user operation event;

when the operation command is not received, driving a timer in the handheld electronic apparatus by the processor to perform a timing operation to time an idle period;

determining whether a length of the idle period is substantially greater than a predetermined value by the processor; and when the length of the idle period is substantially greater than the predetermined value, determining the idle event occurs by the processor;

when the idle event occurs, the processor driving the handheld electronic apparatus to enter a standby mode; and under the standby mode, the processor selectively driving the display device to perform a standby mode display operation with reference to the display mode information; wherein, the display device displays the to-do list information with dimmed backlight in the standby mode display operation.

2. The method according to claim 1, wherein before the step of providing the configuration command in response to the user configuration event, the to-do list configuration process further comprises:

accessing an application in the memory by the processor to drive the display device to provide a user command input interface to a user of the handheld electronic apparatus.

3. The method according to claim 1, further comprising an editing process, the editing process comprising:

providing an editing command by the input interface device in response to an editing event; and editing the data structure by the processor in response to the editing command.

4. A handheld electronic apparatus, comprising:

an input interface device, a display device and a memory;

a processor, coupled to the input interface device, the display device and the memory, for driving the input interface device to provide a configuration command in response to a user configuration event, and determining and storing a data structure into the memory in response to the configuration command; wherein, the data structures records to-do list information and display mode information corresponding to the to-do list information; and a timer;

wherein, the processor further determines whether an idle event occurs, wherein when the processor determines whether the idle event occurs, the processor determines whether the input interface device provides an operation command to the processor in response to a user operation event; the processor further drives the timer to perform a timing operation to time an idle period; the processor further determines whether a length of the idle period is substantially greater than a predetermined value, and the processor determines that the idle event occurs when the length of the idle period is substantially greater than the predetermined value; when the idle event occurs, the processor further drives the handheld electronic apparatus to enter a standby mode; under the standby mode, the processor further selectively drives the display device to perform a standby mode display operation with reference to the display mode information, and the display device displays the to-do list information with dimmed backlight in the standby mode display operation.

5. The apparatus according to claim 4, wherein before the processor drives the input interface device to provide the configuration command, the processor further accesses an application in the memory to drive the display device to provide a user command input interface to a user of the handheld electronic apparatus.

6. The apparatus according to claim 4, wherein the input interface device further provides an editing command in response to an editing event, and the processor further edits the data structure in response to the editing command.

* * * * *